Nov. 20, 1956 R. S. MORRIS, JR 2,771,511
LINE CLEARING DEVICE FOR RECEIVER-OFF-HOOK CONDITION
Filed Aug. 11, 1955
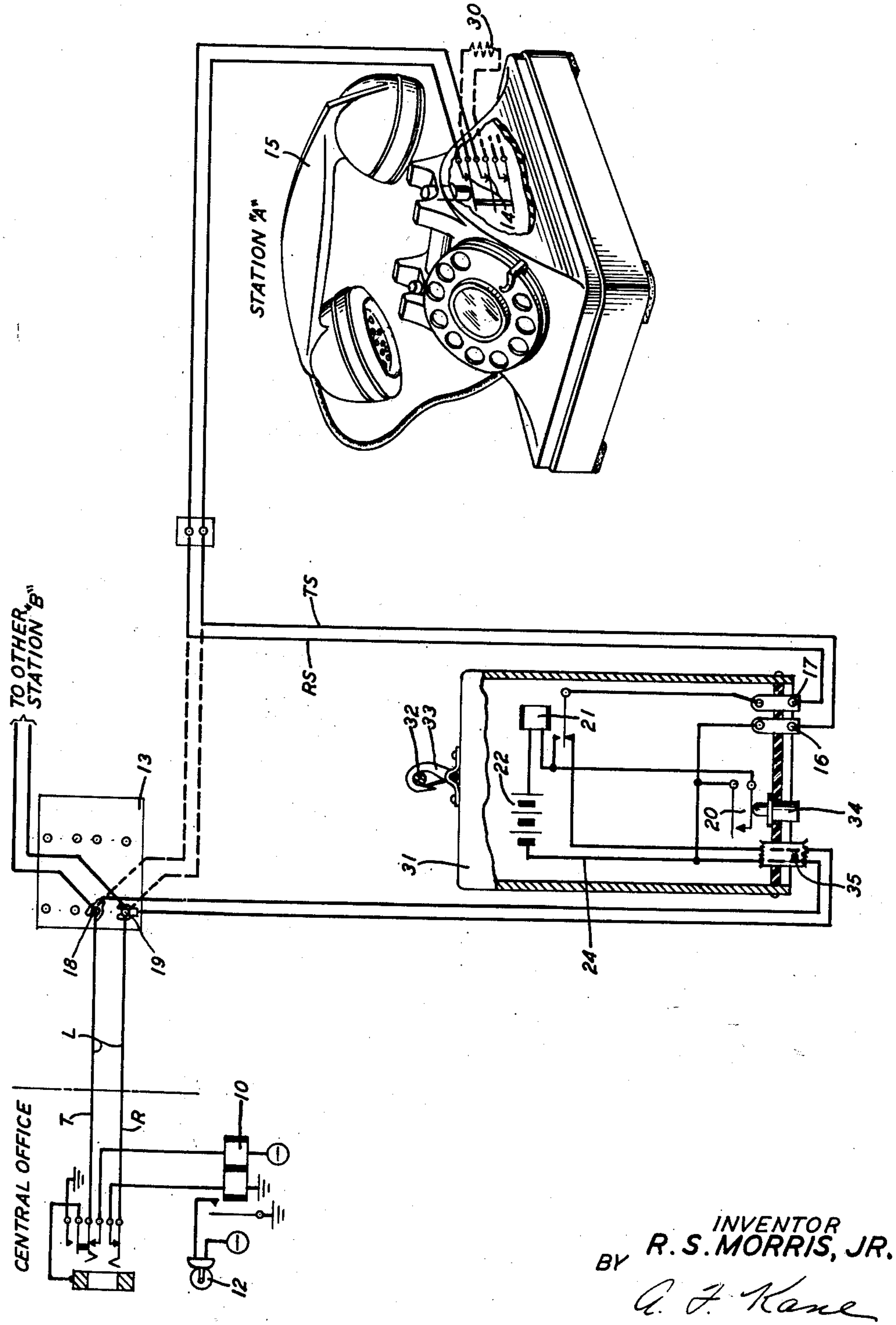
INVENTOR
R. S. MORRIS, JR.
BY A. F. Kane
ATTORNEY Patented Nov. 20, 1956

2,771,511

LINE CLEARING DEVICE FOR RECEIVER-OFF-HOOK CONDITION

Richard S. Morris, Jr., Columbia, S. C., assignor to American Telephone and Telegraph Company, a corporation of New York Application August 11, 1955, Serial No. 527,681

7 Claims. (Cl. 179—30)

This invention relates to means for correcting abnormal or unstandard conditions encountered in telephone communication systems and particularly to a device for clearing a telephone line which has been inadvertently or otherwise "busied" at an inaccessible subscriber's station.

It is an object of this invention to provide a simple and otherwise improved device for clearing, for communication purposes, a telephone line while it is subject to a receiver-off-hook condition at a location temporarily inaccessible.

When the telephone receiver or handset at a subscriber station is not returned to its support at the conclusion of a call on the line associated therewith, the receiver switchhook contacts remain closed and thereby cause the line to test busy at the central office on any subsequent attempts to establish connections to the station over the line. The involved line, therefore, is rendered useless for communication purposes until the unstandard condition is rectified. The seriousness of such a condition is particularly emphasized when the offending station, at which the receiver-off-hook condition prevails, is a party line station. In such a case, not only is the offending station rendered inaccessible to calling parties but the other stations of the party line are similarly deprived of the use of their communication facilities. It occurs frequently that the premises at which the offending station is located becomes temporarily vacated thereby precluding the possibility of a telephone maintenance man entering the premises to advise the subscriber of the switchhook condition with a view towards rectifying it.

In accordance with a feature of the present invention, means is provided whereby a telephone line which is rendered busy at a telephone exchange by the existence of a receiver-off-hook condition at a subscriber's station, may be cleared for communication purposes under conditions which render the offending telephone inaccessible to a maintenance man. More particularly, the line clearing means of this invention comprises an attachment for a telephone line which includes a battery, a relay having a make contact and a break contact, a non-locking manually operable switch and the necessary terminal equipment for inserting the attachment in the "busied" line between the central office and the offending substation. When the attachment is applied to the line in a manner to be more fully described hereinafter, the break contact of the relay is included in series with the closed switchhook contacts at the substation so that when the non-locking switch is actuated to cause the relay winding to be energized in a local circuit involving the attachment battery, and the relay thereupon operates, one of the line conductors is opened at the break contact of the relay to clear the line and thus remove the line busy condition at the central office.

In accordance with another feature of the invention, the attachment relay, when energized, locks operated under the control of the switchhook contacts at the offending station so that when the receiver or handset thereat is restored to its support, the relay releases to extend the conductors of the line to the telephone set at the substation whereby a communication path from the central office is extended to the substation by way of the attachment.

In accordance with a further feature, the attachment of this invention is designed as a weatherproof portable unit and is provided with facilities for hanging it on available appurtenances associated with the cable block of the offending line, and with suitable connectors for facilitating the electrical association of the attachment with the telephone line.

These and other features of the invention will be better understood from the following detailed description when read with reference to the accompanying drawing, the single figure of which illustrates the line clearing attachment of this invention inserted in a multiparty telephone line between a central office and a substation at which a receiver-off-hook condition prevails.

The line clearing unit or restoring box, as it may be aptly designated, comprises a small metal weatherproof box 31 which has fitted to its top a snap hook 33 for hanging the box on a drive ring, peg or similar object 32 available at the cable terminal 13 at which line connections between the multiparty line L extending to the central office CO and the substation A are made. It is understood that the cable terminal 13 is located at some point removed from the immediate location of the substation A and normally is accessible to the telephone maintenance man. Mounted in any suitable manner within the box 31 are a simple electromagnetic relay 21 having a make contact and a break contact, a battery 22 which may comprise two serially connected dry cells, and a non-locking switch 20. In the drawing, these elements are illustrated diagrammatically since it is obvious that they may take various forms and may be mounted and relatively disposed in a multiplicity of ways. A weatherproof two-conductor cord 35, with suitable spade tips, is provided for making connections to the central office side of the line L at the cable terminal 13. This cord extends through a suitable orifice in the base of the box. Also, fixedly located on the base of the box 31 is a pair of terminal posts 16 and 17 by which electrical connections are made between the line clearing attachment and the drop side of the line, that is, the line portion connecting the telephone set at station A to the cable block 13. Also, mounted on the base of the box 31 is a push-button 34 for actuating the interiorly housed non-locking switch 20.

The multiparty telephone line L is shown terminating in a central office of the manual type, in the windings of a line relay 10. It is understood that the showing of a manual termination of the line is for exemplary purposes only, it being apparent that the line may also be terminated in the usual switches of a central office of the automatic type.

As is well known to those familiar with telephone communication systems, the line relay 10 functions to energize a line lamp 12 whenever a call is initiated on the line L at any one of the party line stations, such as stations A and B. For clarity and simplicity of disclosure those portions of the tip and ring conductors T and R of the line L which pass through the cable block 13 are shown in broken lines. It is understood that under normal conditions the talking path to station A effected by the line L includes the broken line portions of the tip and ring conductors passing through the cable terminal 13.

The manner in which the line clearing attachment is employed will now be described and for this purpose it will be assumed that the subscriber at substation A on line L has neglected to restore the handset 15 to its support and that the switchhook contacts 14 therefore remain closed. Obviously, and as is well known, any attempt to seize the line L at the central office under this condition would be met with a busy signal so that actually the line L is now inaccessible to the central office for the completion of any calls to the multiparty line stations and is equally inaccessible to those stations other than station A at which outgoing calls may be attempted. The closed contacts 14 connect a direct-current bridge circuit, involving the telephone transmission elements of the substation telephone, across the line L, as is well known. For simplicity of disclosure this bridge circuit is represented by the dash line resistor 30.

When the central office test desk is made aware of the trouble condition on line L, and a determination made that the trouble is caused by a receiver-off-hook condition at substation A, a maintenance man is dispatched to the premises at which substation A is located. For purposes of this description it will be assumed that the premises are found to be inaccessible. The maintenance man would then employ the line clearing attachment of this invention by hanging the unit 31 on any suitable peg 32 or similar support, in close proximity to the cable terminal 13. The tip and ring conductors TS and RS of the drop extending to the offending station A are then disconnected from the cable terminal 13 and are connected to the corresponding attachment terminals 16 and 17, respectively. The spade tips associated with the conductors of cord 35 are then connected in well-known manner to the cable terminals 18 and 19 to which the conductors T and R of line L are secured. The non-locking switch 20 is then actuated through the medium of push-button 34, causing the winding of relay 21 to be energized in an obvious circuit which includes the battery 22. Relay 21 thereupon operates and, in attracting its armature, locks in a circuit extending from the right terminal of battery 22, through the winding of relay 21, the front or make contact and armature of relay 21, conductor RS by way of terminal 17, conductor RS, the closed switchhook contacts 14 at the offending station, conductor TS and terminal 16, conductor 24, and back to the left terminal of battery 22.

It will be observed that prior to the operation of relay 21, the back or break contact thereof is serially included in circuit with the closed switchhook contacts 14 at substation A. When relay 21 operates, therefore, the continuity of the ring conductor R between the central office CO and the substation A is interrupted so that the line relay 10, if operated, will be released owing to the opening of the station loop at the back contact of relay 21. The line L is thus rendered accessible from the central office and is also rendered accessible to the other subscribers of the multiparty line.

When the subscriber at the substation A returns and restores the handset 15 to its support, thus opening the switchhook contacts 14 and, therefore, the locking circuit for relay 21, this relay releases its armature to reestablish the connection of the ring conductor R to conductor RS by way of the back contact of relay 21.

As soon thereafter as the central office deskman makes the next periodic test of the line, it is found that the normal condition of substation A has been restored. A maintenance man will thereupon be dispatched to the location of the cable terminal 13 to remove the line clearing attachment from the line and to otherwise restore the normal line connections at the cable block.

What is claimed is:

1. The combination of a telephone line having a terminal appearance at a central office and a substation thereon and whose station loop is closed at switchhook contacts of the substation telephone set, and a device for clearing the line comprising an attachment having terminal connectors whereby said attachment may be inserted in said line between the central office appearance thereof and said substation and including a relay, a battery and a manually operable switch, switching means controlled by said relay when said attachment is inserted in said line for completing a connection between the closed switchhook contacts at said substation and the central office terminal appearance of said line by way of a conductor of said line, and means including said battery and said manually operable switch for operating said relay whereby said switching means functions to interrupt the connection completed thereby.

2. The combination according to claim 1 in which said relay, when operated, locks operated under control of the closed switchhook contacts at said substation.

3. The combination according to claim 2 in which the opening of the switchhook contacts at said substation, subsequent to the operation of said relay, releases said relay to thereby extend said line from the central office to the substation by way of said attachment and render said line available to said substation for communication purposes.

4. The combination according to claim 1 in which said manually operable switch is non-locking.

5. The combination according to claim 1 in which said line clearing device is a portable unit provided with means for supporting it with respect to the point at which it is inserted in said line so that connections between said line and said terminal connectors are facilitated.

6. A device for clearing a telephone line, the station loop of which is closed at the receiver switchhook contacts of the substation telephone set, comprising an attachment having terminal connectors whereby said attachment may be inserted in said line between a central office and the substation and including a relay, a battery and a manually operable switch, switching means controlled by said relay when said attachment is inserted in said line for completing a connection between the closed switchhook contacts at the substation and one of the conductors of said line, and means including said battery and said manually operable switch for operating said relay whereby said switching means functions to interrupt the connection of said one line conductor to the closed receiver switchhook contacts.

7. A device for clearing a telephone line, the substation loop of which is short-circuited, comprising an attachment having terminal connectors whereby said attachment may be inserted in said line between a central office and the substation and including a relay, a battery and a manually operable switch, switching means controlled by said relay when said attachment is inserted in said line for completing a connection between the substation and one of the conductors of said line, and means including said battery and said manually operable switch for operating said relay whereby said switching means functions to interrupt the connection of said one line conductor to said substation.

No references cited.